Nov. 24, 1942.   C. KRAMER   2,302,961
AUTOMATIC SAWING MACHINE
Filed April 15, 1940   2 Sheets-Sheet 1

INVENTOR
CHARLES KRAMER
BY John L. Milton
ATTORNEY

Nov. 24, 1942.  C. KRAMER  2,302,961
AUTOMATIC SAWING MACHINE
Filed April 15, 1940  2 Sheets-Sheet 2
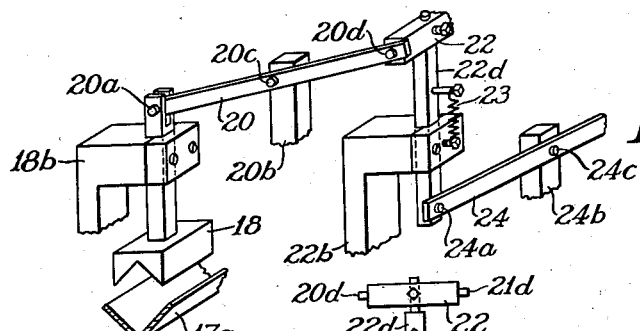
Fig. 4.
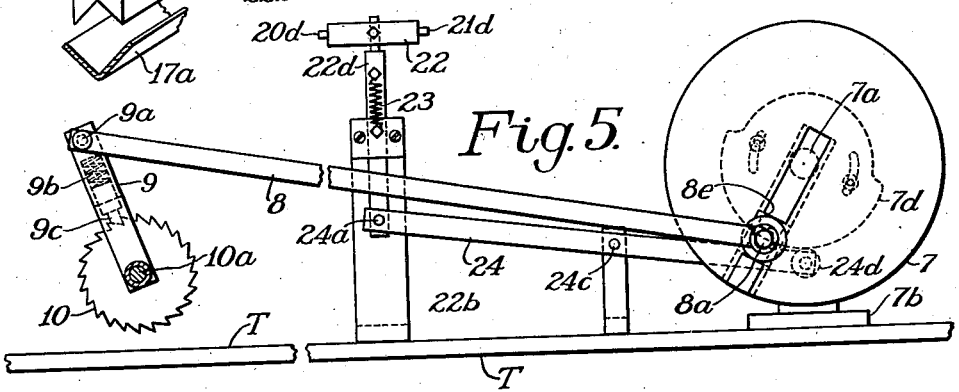
Fig. 5.
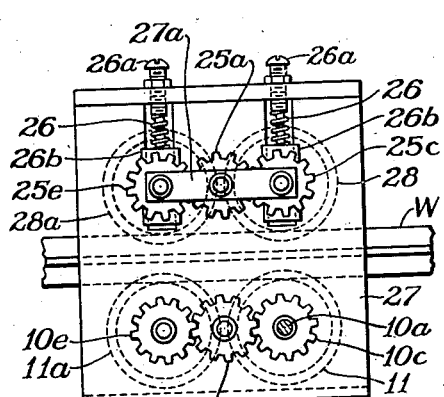
Fig. 6.
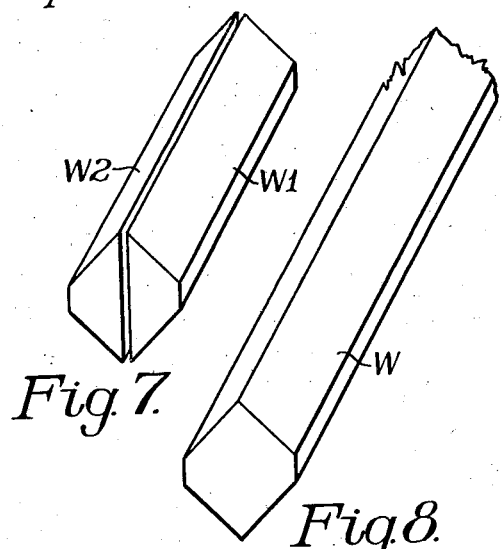
Fig. 7.
Fig. 8.
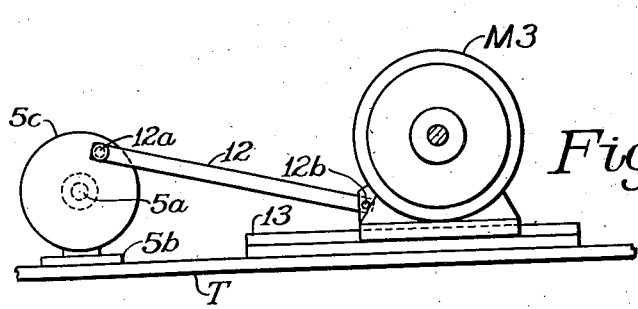
Fig. 9.
INVENTOR
CHARLES KRAMER
BY John L. Milton
ATTORNEY Patented Nov. 24, 1942

2,302,961

UNITED STATES PATENT OFFICE 2,302,961

AUTOMATIC SAWING MACHINE

Charles Kramer, Jeffersonville, Ind.

Application April 15, 1940, Serial No. 329,639

7 Claims. (Cl. 144—1)

This invention relates to automatic sawing machines, and especially to machines for making wood glue blocks and kindred articles. This invention also has particular reference to machines designed for practicing a certain improved method of making such articles, which method also forms a part of this invention.

In the manufacturing of furniture, cabinets and other similar articles, glue blocks are universally employed for reinforcing corner joints and for securing shelves, trim, tops and bottoms, etc., in place. In Figure 7 of the drawings, two such glue blocks are shown in their relative positions, after the cross-cut saw S1 of Figure 1 has cut the blocks from the wooden bar W, which bar was previously longitudinally slit by a rip saw S.

As well known to those skilled in the manufacture of furniture, glue blocks are disposed in the angle of a joint, and the longitudinal right-angled faces of the blocks are each glued to the corresponding faces of the members forming the joint.

Accordingly, since glue blocks are used in relatively large quantities, it is the principal object of this invention to produce a machine that will materially reduce the cost of making such blocks, and which will practice an improved method of making such articles.

A further object of this invention is to produce a machine of portable character, so that the same can be used as an attachment for a conventional band-saw.

Therefore, it is the object of this invention to utilize a band saw for longitudinally slitting the wooden bar from which the glue blocks are formed, and to assemble all other cooperating elements, which perform the automatic features of the invention, as a unitary device, so that the device can be easily and readily applied to the work-table of an existing band-saw.

A further object of this invention is to provide mechanisms for automatically and continuously cleaning and discharging the sawed blocks, so that the finished blocks are entirely free of splinters and frayed edges.

The invention otherwise refers to a new method of making such blocks, wherein a rectangular bar is intermittently fed to a rip saw and longitudinally slit thereby; then intermittently held stationary while a cross-cut saw cuts the blocks from the slit portion of the bar; and wherein the cut blocks are continuously fed into a tumbling mill for cleaning, and then continuously discharged therefrom free of all splinters and frayed edges.

Other objects of the invention reside in details of construction, and the novel combination of the parts together with their mode of operation, as hereinafter described in detail.

A preferred embodiment of the invention is illustrated in the accompanying drawings, wherein:

Figure 4 is a partial view on a slightly enlarged scale and in perspective, and taken along lines 4—4 of Figure 1 for illustrating the operating mechanisms for the clamping block 18;

Figure 5 is a partial side view on an enlarged scale and taken along lines 5—5 of Figure 1, for illustrating the mechanisms that control the intermittent advancement of the wood bar and those which actuate the clamping block mechanism;

Figure 6 is a partial side view on an enlarged scale and taken along line 6—6 of Figure 1;

Figure 7 illustrates the relation of two glue blocks, one to the other, and to the bar from which they are cut;

Figure 8 illustrates the relative shape of the wood bar from which the glue blocks are cut; and Figure 9 is a partial view on a slightly enlarged scale and taken along lines 9—9 of Figure 1, for illustrating the mechanisms for advancing the circular cross-cut saw into and out of operating position.

Briefly described, the preferred machine comprises a table T upon which is mounted the mechanisms for advancing the rectangular wood stock and for cutting-off and cleaning the glue blocks, which table is constructed and arranged for use as an attachment to a band-saw.

Figure 1:
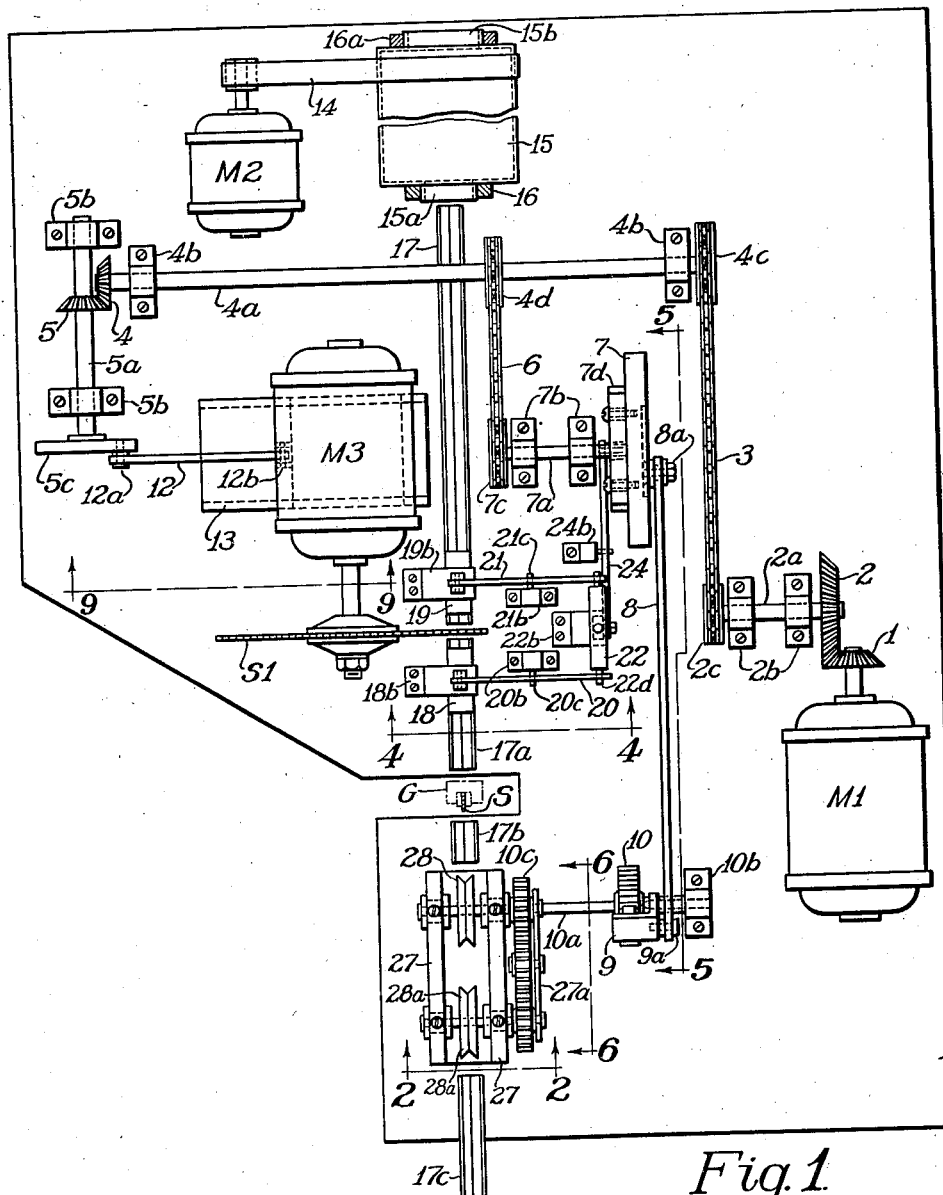
Figure 1 is a plan view of the machine.

Thus, with reference to Figure 1 it will be observed that the operative location of the band saw S, relative to the mechanisms carried by the table T, is clearly illustrated. A series of angled-guides 17c, 17b, 17a, and 17, receive the rectangular wood stock and guide the cut glue blocks into a tumbling mill 15, wherein the blocks are cleaned of all splinters and frayed edges.

Accordingly, the rectangular stock W illustrated in Figure 8 is received by guide 17c and directed into and between rollers 11—28 of an automatic advancing mechanism. Observe Figures 2 and 6. Guides 17b and 17a serve to direct the rectangular stock W past a band saw S, which saw longitudinally rips or slits the rectangular stock as illustrated in Figure 7.

A circular saw S1 intermittently moves transversely of the path of the slit stock for cutting the same into glue blocks W1—W2 of the desired length, whereupon the guide 17 directs the cut blocks W1—W2 into a tumbling mill 15 through a relatively small aperture 15a. The mill 15 continuously rotates, and the finished blocks are continuously discharged therefrom via a larger aperture 15b.

Figure 2:
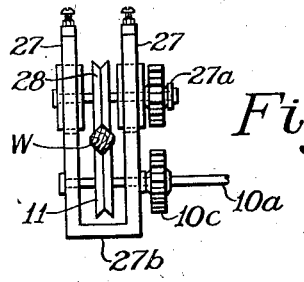
Figure 2 is a partial end view taken along lines 2—2 of Figure 1.

The operation of the band saw is continuous, however, its work upon the rectangular stock W is determined by the operation of the automatic advancing mechanism particularly illustrated in Figures 2, 5 and 6.

As hereinbefore mentioned, the advancing mechanism intermittently advances the rectangular stock W, and each advancement is equal to the length of the glue block. This intermittent operation of the advancing mechanism is determined by the operation of a spring pawl 9c carried by the pawl assembly 9, and a ratchet 10 shown in Figures 1 and 5.

With particular reference to Figure 5, it will be observed that a disc 7 rotates in a clockwise direction. A connecting link 8 is pivotally secured at 8a to a key 8e, which key has a radially-adjustable, sliding dove-tail-connection with the outer face of the disc 7, for adjustably varying the stroke of link 8, which adjustment determines the length of the block. Accordingly, the key 8e is adjusted, and secured to the disc 7, to provide the required movement for the connecting link 8.

The opposite end of the link 8 is pivotally secured at 9a to a pawl lever 9, which lever is pivotally mounted on a shaft 10a. A ratchet 10 is fixedly secured to the shaft 10a, which shaft, as illustrated in Figures 1 and 2, is journaled in a bearing pedestal 10b, secured to the table T, and in the sides 27 of the advancing mechanism.

As illustrated in Figures 2 and 6, four V-shaped pulleys 11, 11a, 28 and 28a are disposed between the sides 27—27, and these pulleys are constructed and arranged to advance the rectangular stock W longitudinally along the V-shaped guides 17c, 17b, 17a and 17. The pulley 11 is fixedly secured to shaft 10a, and each of the pulleys 11a, 28 and 28a are each respectively fixedly secured to stub shafts, and the shaft for pulley 11a is journaled in the sides 27—27 of the advancing mechanism. Spur gears 10c, 25c and 25e are each respectively secured to the outer ends of the aforesaid stub shafts, and the spur gear 10c is fixedly secured to the shaft 10a. As particularly illustrated in Figure 6, a spur gear 10d is pivotally secured to the side 27, and operatively meshed with each of the gears 10c and 10e. Therefore, rotation of gear 10c in the clockwise direction provides a similar rotation of gear 10e, via gear 10d.

The stub-shafts for each of the pulleys 28 and 28a are each journaled in suitable bearing blocks, which bearing blocks are slidably mounted for vertical movement in the sides 27—27 of the advancing mechanism. Compression springs 26—26 are associated with each of the said bearing blocks for biasing the same downwardly, and each of the springs are adjusted by means of screws 26a—26a. A strap 27a is journaled on the outer ends of the stub shafts for pulleys 28 and 28a, and a spur gear 25a is pivotally secured thereto, which gear likewise operatively meshes with gears 25c and 25e. Accordingly, anti-clockwise rotation of gear 25c provides a similar rotation of gear 25e, via gear 25a.

From the foregoing it will be apparent that clockwise rotation of shaft 10a provides a similar clockwise rotation of pulleys 11 and 11a. Therefore, by reason of the pressure applied by springs 26—26 upon the rectangular bar W via pulleys 28 and 28a, sufficient frictional engagement of each pulley with the rectangular stock W is provided to assure uniform advancement of same.

Referring now to Figure 5 it will be apparent that, with each revolution of disc 7, ratchet 10 is intermittently rotated clockwise in accordance with the reciprocating action of the connecting ling 8. It will also be observed that the disc 7 has a cam 7d fixedly and adjustably secured to its inner face. This cam intermittently actuates the mechanism operating the clamping blocks 18 and 19, and is regulated to apply the clamping blocks to the rectangular stock W, when the same is stationary, and to release the clamping blocks, when the advancing mechanism is actuating.

Figures 1, 4 and 5 illustrate the operating parts of the clamping mechanism, and it will be observed that the clamping blocks 18 and 19 are each respectively, slidably-mounted in pedestals 18b and 19b. A lever 20 operates the clamping block 18, and this lever is pivotally secured at 20c to a pedestal 20b carried by the table T. The lever 20 is pivotally secured at 20a to the clamping block 18, and at 20d to a cross-bar 22.

A lever 21 operates the clamping block 19, and this lever is pivotally secured at 21c to a pedestal 21b also carried by the table T. The lever 21 is also pivotally secured at one end to the clamping block 19, and at its opposite end to the aforesaid cross-bar 22.

The cross-bar 22 is fixedly secured to a vertical post 22d, which post is slidably mounted in a pedestal 22b, likewise carried by the table T. A tension spring 23, illustrated in Figures 4 and 5, serves to bias the clamping blocks 18 and 19 out of clamping relationship, via the interconnecting levers 20 and 21.

The lower end of post 22d is pivotally secured at 24a to a lever 24, and the lever 24 is pivotally secured at 24c to a pedestal 24b. A roller 24d is pivotally secured to the opposite end of lever 24, and this roller is in operative engagement with the cam 7d. Accordingly, inspection of Figures 1, 4 and 5 will reveal that the raised portion of cam 7d depresses the roller 24d, thereby depressing one end of lever 24. The latter depression of lever 24 raises post 22d, which, via cross-bar 22 and levers 20—21, forces the clamping blocks 18 and 19 into engagement with the rectangular stock W.

Likewise, the roller 24d, upon disengaging the raised portion of cam 7d, releases the aforesaid mechanism, and spring 23, via cross-bar 22 and levers 20—21, raises each clamping block 18—19 out of engagement with the rectangular stock W.

Figure 3:
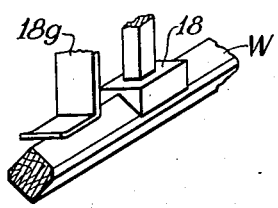
Figure 3 is a partial view in perspective and on a slightly enlarged scale for illustrating a guide-shoe 18g in front of a clamping block 18.

As illustrated in Figure 3, a guide shoe 18g is fixedly secured to pedestal 18b, for directing and retaining the rectangular stock W in the guide 17a.

Disc 7 is fixedly secured to a shaft 7a, which shaft is journaled in pedestals 7b—7b, and has secured at its opposite end a sprocket 7c. A similar sprocket is fixedly secured to a shaft 4a and a chain 6 operatively connects the said sprockets.

The shaft 4a is journaled in pedestals 4b—4b, and has fixedly secured thereto at one end a beveled gear 4, and at its opposite end a sprocket 4c.

The bevel gear 4 meshes with a similar gear 5, which gear is fixedly secured to a shaft 5a. The shaft 5a is journaled in pedestals 5b—5b, and has a disc 5c secured thereto. A link 12 is pivotally secured at 12a to the disc 5c, and at 12b to the base of a motor M3.

With particular reference to Figures 1 and 9, it will be observed that the motor M3 rotates a circular cross-cut saw S1, which saw reciprocates transversely of the slit rectangular-stock W, for cutting the same into glue blocks W1—W2. The base of the motor is provided with a slidable, dovetail-connection with a key 13 disposed laterally of the table T. Therefore, it will be evident that each rotation of the disc 5c moves the cross-cut saw S1 into and out of operative relation with the rectangular stock W.

A motor M1 is fixedly secured to the table T, which, via beveled gears 1 and 2, rotates shaft 2a at reduced speed. The shaft 2a is journaled in pedestals 2b—2b and has a sprocket 2c secured thereto. A chain 3 operatively connects the sprockets 2c and 4c.

Summarizing the operation of the foregoing, motor M1 rotates shaft 4a at reduced speed, via beveled gears 1—2, sprockets 2c—4c, and chain 3. A disc 5c is operatively connected to the shaft 4a, via beveled gears 4—5 and shaft 5a, and the cross-cut saw S1 is reciprocated transversely of the rectangular stock w, via connecting link 12.

Disc 7 and the attached cam 7d are rotated at the same speed of disc 5c, via sprockets 4d—7c, chain 6 and shaft 7a.

The advancing mechanism comprising pulleys 11, 11a, 28 and 28a is intermittently operated, via shaft 10a, ratchet 10, assembly 9, link 8 and the operative connection with disc 7. During the interval in which the aforesaid advancing mechanism is advancing the rectangular stock W, spring 23 releases the clamping blocks 18—19, the band saw S rips the rectangular stock W, as illustrated in Fig. 7, and the cross-cut saw S1 is out of operative relation. However, when the raised portion of cam 7d engages the roller 24b, the clamping blocks 18—19 engage the rectangular stock, and the cross-cut saw S1 advances into operative relation and cuts the slit stock W to form two glue blocks W1—W2, as illustrated in Figure 7.

As aforesaid, the thus formed glue blocks are directed, via guide 17, into the tumbling mill 15 for cleaning.

As illustrated in Figure 1, the tumbling mill 15 is journaled in pedestals 16 and 16a, which pedestals are secured to the table T. The motor M2 is also secured to the table T, and, via belt 14, continuously rotates the said mill.

From the foregoing it is evident that many changes in the construction and location of the mechanisms may be made without departing from the spirit of the invention. Therefore, having thus described the invention, the various constructions and operations are not to be limited other than by the scope of the appended claims.

I claim:

1. An automatic sawing machine comprising, a guide member forming a longitudinal path through which a work piece of strip material is moved to receive successive operations thereupon, the said guide member having a plurality of gaps in the longitudinal path of the said work piece for receiving instrumentalities acting upon the said work piece; an advancing mechanism disposed in one of the said gaps including a plurality of rollers adapted to engage frictionally and to advance the said work piece; a rip-saw disposed in the next successive one of said gaps and adapted to rip longitudinally the work piece as it is advanced past the said rip-saw; a cross-cut saw disposed in the next successive one of said gaps and adapted to reciprocate transversely of the said guide member to sever laterally the said work piece; clamping means disposed adjacent the last mentioned of said gaps and adapted to clamp the work piece to the said guide member; a driving mechanism including a constantly-rotating drive-shaft; a bell-crank secured to the said drive-shaft, and operatively associated with the said cross-cut saw, for reciprocating the same transversely of the said guide member for severing the ripped portion of the work piece; a cam operatively associated with the said clamping means and adapted to operate and to release the same alternately and successively; means operating the said cam in timed relationship with the said bell-crank, for operating the said clamping means as the cross-cut saw is reciprocated transversely of the guide member and for releasing the said clamping means when the said cross-cut saw is withdrawn from the said guide member; a ratchet-driven mechanism operatively associated with the said advancing mechanism, for intermittently and successively operating the same; and means operating the said ratchet-driven mechanism in timed relation with the said clamping means, for operating the advancing mechanism to advance the said work piece when the clamping means is released.

2. An automatic sawing machine including, in combination, an advancing mechanism having a plurality of rollers adapted to engage frictionally and to advance longitudinally a work piece of strip material; a cross-cut saw adapted to move transversely of the work piece for laterally severing the same; clamping means, operatively associated with the work piece substantially adjacent the said saw, for clamping the same during the operation of the saw upon the work piece; a first bell-crank operatively associated with the said cross-cut saw; means operating the said first bell-crank, for alternately and successively moving the said saw into and out of cutting relation with the said work piece; a cam operatively associated with the said clamping means and adapted to operate and to release the same alternately and successively; means operating the said cam in timed relation with the said first bell crank, for operating the clamping means as the saw is moved into cutting relation and for releasing the clamping means as the saw is moved out of cutting relation; a ratchet wheel operatively associated with the said advancing mechanism having a cooperating pawl adapted to oscillate about the periphery thereof for intermittently and successively rotating the said rollers to advance intermittently and successively the said work piece; a second bell crank operatively associated with the said pawl for operating the same; and means operating the said second bell crank in timed relation with the said cam, for operating the said advancing mechanism as the clamping means is released from the work piece.

3. An automatic sawing machine including, in combination, an advancing mechanism having a plurality of rollers adapted to engage frictionally and to advance a work piece of strip material; a cross-cut saw adapted to move transversely of the said work piece for laterally severing the same; clamping means, operatively associated with the work piece substantially adjacent the said saw, for clamping the same during the operation of the saw to sever the said work piece; a line-shaft; driving mechanism operatively associated with the said line shaft and constantly rotating the same; a first counter-shaft extending substantially at right angles to the said line-shaft an operatively connected thereto; a bell crank secured to the said first counter-shaft, and operatively connected to the said saw, for alternately and successively moving the same into and out of cutting relation with the work piece; a second counter-shaft extending substantially parallel with the said line-shaft and operatively connected thereto; a cam secured to the said second counter-shaft; means, operatively associated with the said clamping means and adapted to be actuated by the said cam in timed relation with the operation of the said first bell crank, for moving the said clamping means into clamping relation with the said work piece as the saw is moved into cutting relation therewith, and for releasing the clamping means from clamping relation with the said work piece as the saw is moved out of cutting relation; a ratchet wheel operatively associated with the said advancing mechanism for operating the same; a pawl operatively associated with the said ratchet wheel, and adapted to oscillate about the periphery thereof, for intermittently and successively rotating the said ratchet, to intermittently and successively operate the said advancing mechanism; and a second bell crank secured to the said second counter-shaft and operatively connected to the said pawl for oscillating the same, the said second bell crank adapted to operate the pawl to rotate the said ratchet, when the clamping means is released from the said work piece.

4. An automatic sawing machine including in combination, an advancing mechanism having a plurality of rollers adapted to engage frictionally and to advance a work piece of strip material; a cross-cut saw adapted to move transversely of the said work piece for laterally severing the same; a line-shaft; driving mechanism operatively associated with the said line shaft and constantly rotating the same; a first counter-shaft extending substantially at right angles to the said line-shaft and operatively connected thereto; a bell crank secured to the said first counter-shaft, and operatively connected to the said saw, for alternately and successively moving the same into and out of cutting relation with the work piece; a second counter-shaft extending substantially parallel with the said line shaft and operatively connected thereto; a ratchet wheel operatively associated with the said advancing mechanism for operating the same; a pawl operatively associated with the said ratchet wheel, and adapted to oscillate about the periphery thereof, for intermittently and successively rotating the said ratchet, to intermittently and successively operate the said advancing mechanism; and a second bell crank secured to the said second counter-shaft and operatively connected to the said pawl for oscillating the same, the said second bell crank adapted to operate the pawl to rotate the said ratchet, when the said saw is moved out of cutting relation with the said work piece.

5. An automatic sawing machine including, in combination, a band saw; an advancing mechanism having a plurality of V-shaped rollers arranged in tandem and in front of the band saw for receiving and advancing a rectangular bar of strip material past the said band saw, to rip longitudinally the material diagonally of its rectangular section; a cross-cut saw adapted to move transversely of the ripped material for laterally severing the said ripped material into short strips having a triangular section; clamping means, operatively associated with the said material substantially adjacent the said cross-cut saw, for clamping the said material during the operation of the said cross-cut saw to sever the same; a line shaft having a driving mechanism operatively associated therewith for continuously rotating the same; a first counter shaft extending substantially at right angles with the said line shaft and operatively connected thereto; a first bell crank secured to the said first counter-shaft and operatively connected to the said cross-cut saw; for alternately and successively moving the same into and out of cutting relation with the said material; a second counter-shaft operatively connected to the said line shaft and having a cam secured thereto; means, operatively associated with the said clamping means and adapted to be actuated by the said cam in timed relation with the operation of the said first bell crank, for moving the said clamping means into clamping relation with the said work piece as the cross-cut saw is moved into cutting relation therewith, and for releasing the clamping means from clamping relation with the said work piece as the cross-cut saw is moved out of cutting relation; a ratchet wheel operatively associated with the said advancing mechanism and having a pawl adapted to oscillate about the periphery thereof, for intermittently and successively rotating the said ratchet, to intermittently and successively operate the said advancing mechanism; and a second bell crank secured to the said second counter-shaft and operatively connected to the said pawl for oscillating the same, the said second bell-crank adapted to operate the pawl to rotate the ratchet as the cross-cut saw is moved out of cutting relation with the said material.

6. An automatic sawing machine as set forth in claim 5 comprising means operatively associated with the said second bell crank for adjustably varying the length of the rotating arm of the said second bell crank to vary the oscillatory movement of the said pawl, thereby, to vary the amount of material advanced by the said advancing mechanism during each rotation of the said second bell-crank.

7. An automatic sawing machine as set forth in claim 5 comprising means operatively associated with the operative connection between the said second bell crank and the said pawl of the said advancing mechanism, for varying the oscillatory movement of the pawl, thereby to vary the amount of material advanced by the said advancing mechanism during each rotation of the said second bell-crank.

CHARLES KRAMER.